Patented Oct. 3, 1950

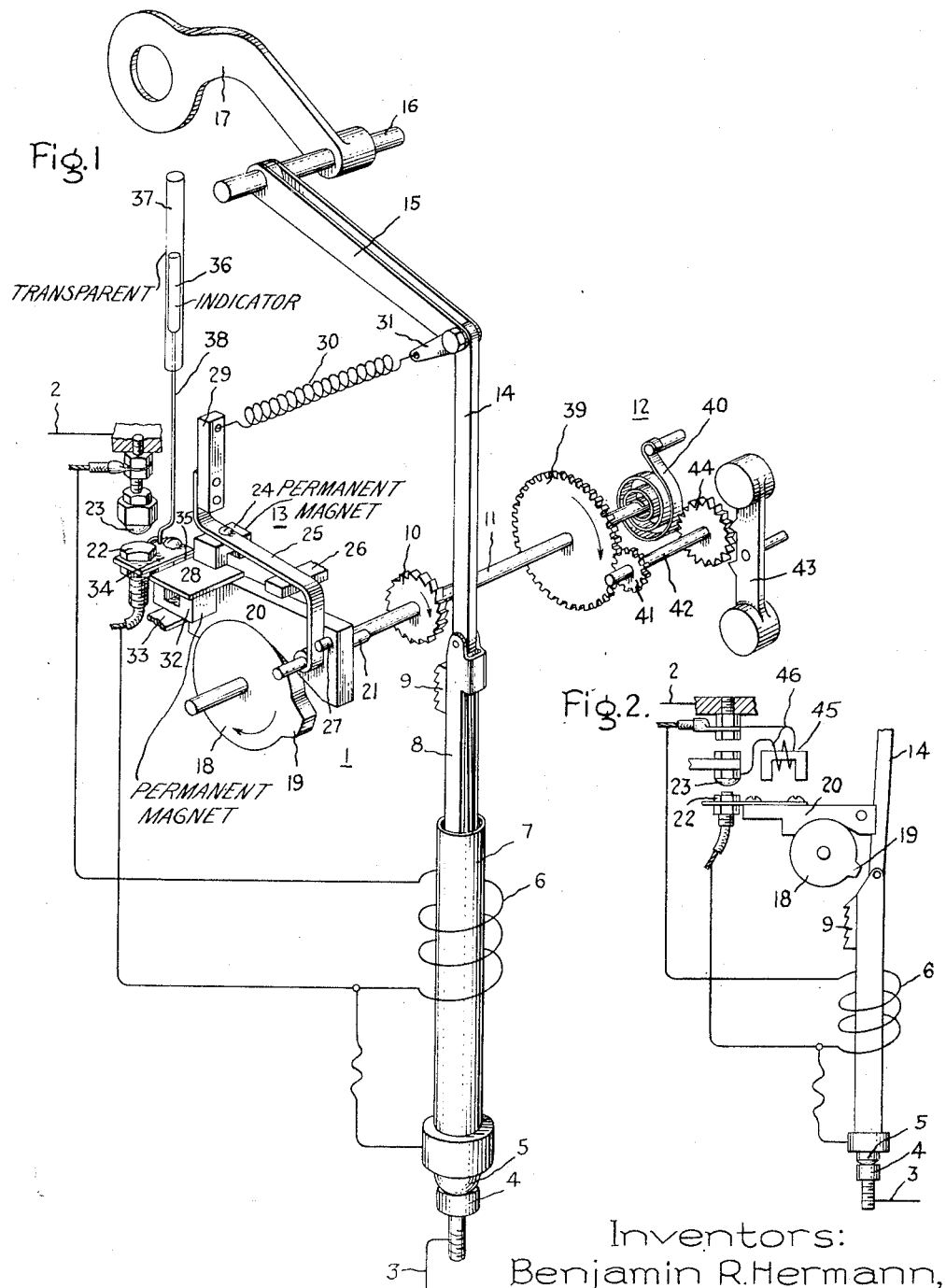

2,524,525

UNITED STATES PATENT OFFICE 2,524,525

AUTOMATIC RECLOSING CIRCUIT INTERRUPTER

Benjamin R. Hermann, Lanesborough, and Sidney R. Smith, Jr., Pittsfield, Mass., assignors to General Electric Company, a corporation of New York Application November 5, 1945, Serial No. 626,840

9 Claims. (Cl. 200—89)

Our invention relates to automatic reclosing circuit interrupters and more specifically is an improvement on the invention disclosed and claimed in copending Lincks and Jensen application, Serial No. 468,522, filed December 10, 1942, now Patent No. 2,414,786, granted January 21, 1947, and assigned to the same assignee as the present application.

Automatic reclosing circuit interrupters have in recent years been extensively used in distribution systems. Such automatic reclosing circuit interrupters are employed in such distribution systems and coordinated with fuses and the like so that in the event of a fault on the system whether the fault is permanent or temporary in nature, there will be a minimum of service discontinuity. Along these lines a distribution system is sectionalized at many points and if the fault is of a permanent nature it is desirable that only the small section where the fault is located be disconnected from the system and all the remaining portions thereof remain in service.

Automatic reclosing circuit breakers inherently are ideal devices for taking care of temporary faults since by opening and reclosing one or more times with substantially no visible inconvenience to customers of power service, the fault is disposed of and continuity of service maintained. As has been brought out in the above mentioned Lincks and Jensen application, continuity of service can be improved particularly with regard to permanent faults if following several immediately successive operations of the automatic reclosing circuit interrupting device which indicates a permanent fault on the system, the circuit interrupting device is effectively maintained in the closed position for a short period of time so that protective devices such as fuses controlling the faulted section of the system have time to operate to isolate this faulted section. Our invention is specifically concerned with a rather simple arrangement for effectively maintaining the automatic reclosing circuit interrupting device in the closed position following successive operations thereof which indicate a permanent fault on the system.

It is an object of our invention to provide a new and improved automatic reclosing circuit interrupter.

It is another object of our invention to provide a new and improved automatic reclosing circuit interrupter with simple means for effectively maintaining the contacts thereof in the closed position following successive operations which indicate a permanent fault on the associated system.

Still another object of our invention is to provide an automatic reclosing circuit interrupter of the type employing an electromagnet for interrupting the circuit in response to an abnormal current condition with simple means for short circuiting said electromagnet for a predetermined time following a permanent fault on a portion of an associated distribution system.

Further objects and advantages of our invention will become apparent as the following description proceeds and the features of novelty which characterize our invention will be pointed out with particularity in the claims annexed to and forming a part of this specification.

For a better understanding of our invention reference may be had to the accompanying drawing in which Fig. 1 is a schematic perspective view of one embodiment of our invention, and Fig. 2 is a schematic diagram of a modification of our invention.

Our invention is particularly applicable to automatic reclosing electric circuit breakers of the type disclosed in Walle Patent 2,069,082, granted January 26, 1937, and assigned to the same assignee as the present application, or reclosing circuit breakers as illustrated in the above mentioned Lincks and Jensen application. In order to simplify the description only the essential portions of such a circuit interrupter in so far as our invention is concerned are shown in the drawing, but it should be understood that the remaining parts thereof are similar to the disclosures of the Walle patent or the Lincks and Jensen application.

Referring now to Fig. 1, we have illustrated an automatic reclosing circuit breaker generally indicated at 1 which is adapted to be associated with a distribution system having the line sections 2 and 3 connected thereto. Automatic reclosing circuit breaker 1 comprises a pair of relatively movable contacts illustrated as a stationary contact 4 and a movable contact 5 which are respectively connected to the sections 3 and 2 of the distribution circuit with which automatic reclosing circuit interrupter 1 is associated. Opening of automatic reclosing circuit interrupter 1 is obtained through operation of an electromagnet having a winding 6 and an armature 7. Winding 6 is connected in series with contacts 4 and 5 and the line sections 2 and 3 so that whenever the current increases to a predetermined value due to a fault somewhere on the associated system, for example, relative separation of contacts 4 and 5 occurs.

Contact 5 is normally biased to the closed position either by gravity alone or preferably supplemented by means of a spring (not shown). Whenever a fault occurs on the associated distribution circuit contacts 4 and 5 are separated to interrupt the circuit. Such interruption of the circuit causes immediately deenergization of winding 6 and gravity supplemented by suitable spring means, if desired, causes immediate reclosing of contacts 4 and 5. Thus it is obvious that the series winding 6 for operating the circuit interrupter inherently provides the reclosing feature. If the fault is temporary in nature circuit breaker 1 will remain closed after this one opening operation.

As in the Walle patent referred to above, it may be desirable to have the circuit breaker 1 open and close a predetermined number of times to determine whether or not the fault is temporary or permanent. If the circuit breaker continues to open and close it is evident that a permanent fault exists and it is desirable to isolate that section of the distribution system including the permanent fault and only that section. As was pointed out above, our invention is specifically concerned with an automatic reclosing circuit interrupter in which the circuit interrupter is effectively maintained in the closed position for a predetermined time upon determining that a permanent fault exists so that fuses or other circuit protecting devices coordinated therewith may operate to isolate the faulty section of the system.

With the arrangement described thus far, circuit interrupter 1 will continue to open and close indefinitely in the event of a permanent fault. As in the above mentioned Walle patent and the Lincks and Jensen application referred to above, an operating rod 8 having a ratchet member 9 attached thereto is associated with movable contact 5 and armature 7. Ratchet member 9 is biased by suitable means (not shown) to engage upon downward movement of contact rod 8 a coacting ratchet wheel 10 which is mounted on a shaft 11 and controls a driving and timing mechanism generally indicated at 12 and also a mechanism generally indicated at 13 embodying our invention. Every time that circuit breaker 1 opens and recloses ratchet 9 engages coacting ratchet wheel 10 and rotates it in a clockwise direction as indicated by the arrows in Fig. 1.

In order that relative separation of contacts 4 and 5 may be manually obtained contact rod 8 is connected by means of a link 14 to a crank 15 rotatable with a shaft 16 suitably mounted in a fixed support. A manual lever 17 may be actuated by a suitable switchstick or the like to rotate shaft 16 and consequently open contacts 4 and 5.

As is also disclosed in the above mentioned Lincks and Jensen patent, one means of effectively maintaining an automatic reclosing circuit breaker of the type disclosed above in the closed position is to provide means for short circuiting all or a portion of the series winding 6 of the electromagnet. Our invention is particularly concerned with a new and improved arrangement for accomplishing this short circuiting of winding 6.

In accordance with our invention, there is mounted on the shaft 11 supporting ratchet wheel 10 a cam 18 which is generally in the form of a disk except that it is provided with a raised portion 19. Cam 18 is in engagement with a cam follower 20 pivotally mounted to a fixed support by means of a shaft 21. When shaft 11 is rotated in the direction of the arrows indicated in Fig. 1 to such an extent that raised portion 19 of cam 18 engages cam follower 20, cam follower 20 is rotated in a clockwise direction as viewed in Fig. 1.

Supported on the end of cam follower 20 is a movable contact 22 which is adapted to engage with a stationary contact 23 when cam follower 20 is raised by extension 19 of cam 18. Stationary contact 23 is electrically connected to one end of series winding 6 while movable contact 22 is connected to the other end of series winding 6 and also to movable contact 5. With this arrangement, it is obvious that when contact 22 is in engagement with contact 23 series winding 6 is short circuited through these contacts and insufficient current will flow through series winding 6 in view of its inherent impedance to cause separation of interrupting contacts 4 and 5. As long as contacts 22 and 23, which will hereinafter be referred to as the short circuiting contacts, are maintained in the closed position, automatic reclosing circuit interrupter 1 is effectively maintained in the closed position just as much as if it were "locked" in the closed position.

In order to hold short circuiting contacts 22 and 23 in the closed position once cam 18 has rotated sufficiently to close them, we have provided a permanent magnet 24 mounted on a support 25 rotatable about shaft 21. A stop 26 limits the downward movement of support 25 and consequently the downward movement of permanent magnet 24. The upward movement of support 25 and permanent magnet 24 is limited by another stop 27 mounted on cam follower 20. Cam follower 20 is provided with a magnetic plate 28 positioned so that, when cam follower 20 is raised by cam 18 to cause closure of short circuiting contacts 22 and 23, permanent magnet 24 will engage magnetic plate 28 and hold the short circuiting contacts in the short circuiting position.

In order to reset the automatic reclosing circuit breaker once short circuiting contacts 22 and 23 have effectively "locked" contacts 4 and 5 in the closed position, we interconnect the free end of pivotally mounted support 25 by means of a member 29 and a spring 30 with the end of crank 15, as is indicated at 31. With this arrangement, it is obvious that when crank 15 is rotated with shaft 16 upon downward movement of manually actuatable lever 17 permanent magnet 24 is moved upwardly away from magnetic plate 28 to such an extent that plate 28 is sufficiently outside the range of coercive force of magnet 24 to permit cam follower 20 freedom to move downwardly with the consequent opening of short circuiting contacts 22 and 23.

When the contact 5 approaches the closed position, support 25 engages stop 26. Spring 30 is designed to be entirely slack and does not exert an upward force on support 25 and magnet 24 as the contact 5 nears its closed position. When lever 17 is moved downwardly manually the force exerted on magnet 24 by spring 30 increases progressively until the spring force is sufficiently great to overcome the magnetic attraction between the plate 28 and the magnet 24. The force exerted by the spring 30 increases as crank 15 moves counterclockwise due to the increase in the distance between members 29 and 31 and also because the effective component of the force exerted by spring 30 is increased due to the fact that the line of action of spring 30 becomes more nearly parallel with the path of travel of the magnet 24 as the crank 15 is moved counterclockwise. Thus it will be observed that spring 30 is ineffective to move magnet 24 away from plate 28 when the contact 5 is close to or in engagement with the contact 4 and that spring 30 is effective to rotate the support 25 when contact occupies a position near the upper limit of its travel.

As the link 14 moves upwardly during automatic circuit opening operations the magnet 24 moves upwardly obviously without any effect on plate 28 and contact 22 until after the raised portion of cam 18 has engaged cam follower 20 and caused a predetermined clockwise rotation of cam follower 20. Since contacts 22 and 23 cannot be closed as a result of an opening movement of the contact 5, a certain amount of downward closing movement of contact 5 is necessary to cause contact 22 to engage contact 23 during the final one of a series of consecutive reclosures. This downward movement of contact 5 which causes the contact 22 to engage the contact 23 will also result in lowering support 25 and magnet 24 into engagement with stop 26 at which position it will perform its holding function as described above as soon as the contact 22 engages contact 23. If the spring 30 is not sufficiently slack at the time the contacts 22 and 23 become closed to allow the support 25 to engage the plate 26 as might be the case should contacts 22 and 23 close after contact 5 had moved only a short distance toward contact 4, then the magnet 24 would be held out of engagement with the plate 28 for a short time after contacts 22 and 23 are closed. Further downward motion of contact 5 would then lower spring 30, support 25 and magnet 24 and would cause a slackening of spring 30 thereby to cause magnet 24 to perform its holding function. While the spring 30 is being lowered during the latter stages of the closing movement of contact 5, the contact 22 would be held in engagement with the contact 23 by the raised portion 19 of the cam 18.

It is obvious that once contacts 22 and 23 are closed no further automatic openings of contacts 4 and 5 will occur until after contacts 23 and 24 are opened by manually resetting the device by pulling downwardly on handle 17.

The high speed operation of an automatic reclosing circuit breaker such as the one described above causes a certain amount of vibration, and to prevent this vibration from inadvertently causing bouncing of cam follower 20 so that magnet 24 can hold magnetic plate 28 in its upward position, we have found it desirable to provide a second permanent magnet 32 mounted on a suitable fixed support 33 beneath magnetic plate 28 thereby normally holding cam follower 20 in its lowermost position and also normally holding short circuiting contacts 22 and 23 in their open position. It is quite obvious that if cam follower 20 had sufficient mass, gravity alone would be satisfactory, but for a device in which cam follower 20 is small and light we have found it desirable to supplement the effect of gravity by means of permanent magnet 32.

By using two permanent magnets such as 24 and 32, it is possible to employ a stronger permanent magnet 24 than would otherwise be the case so that the contacts would effectively hold in the closed position against any normal vibration. Because of the pull characteristic of magnets, they are much more suitable for this purpose than a spring would be. A spring would afford a very large pressure to hold cam follower 20 in its downward position against the forces of vibration, but unfortunately a spring would constantly apply a pressure to open contacts 22 and 23, whereas magnet 32 will not have this undesirable effect once magnetic plate 28 is moved out of the range of its coercive force.

We have also found it desirable resiliently to support contact 22 from the end of cam follower 20. This may be accomplished in any suitable manner, and we have chosen to illustrate it in the drawing by means of a semi-resilient plate 34 which is supported by narrow resilient arm 35 from the end of cam follower 20. With this arrangement, movable contact 22 is effectively mounted on a spring, and as a result bouncing of these contacts is eliminated as is also the problem of welding closed of these contacts.

It is desirable for an operator to know whether the short circuiting contacts 22 and 23 are in the closed or open position. To this end, we have provided an indicator which comprises a plunger 36 movable in a glass cylinder 37 mounted in a visible position on the automatic reclosing circuit interrupter 1. Plunger 36 is connected by a suitable rod 38 with plate 34 whereupon it clearly indicates by its position in glass tube 37 whether short circuiting contacts 22 and 23 are open or closed.

The time delay and driving mechanism 12 mentioned above is substantially identical with that described in the Lincks and Jensen application referred to above. The driving portion of mechanism 12 includes a gear 39 rotatable with shaft 11 and a suitable spring 40 which normally biases gear 39 and ratchet wheel 10 in a counterclockwise direction as viewed in Fig. 1. The time delay portion of the mechanism includes gear 41 supported on a shaft 42. Gear 41 is meshed with gear 39. An escapement device comprising an oscillating member 43 and a cooperating escapement wheel 44 mounted on shaft 42 controls the speed of rotation of shaft 11. Whenever ratchet member 9, having moved upwardly, starts to move downwardly by virtue of gravity and a suitable spring (not shown), ratchet wheel 10 is rotated in the direction of the arrows in Fig. 1 as are also cam 18, gear 39 and shaft 11. Spring 40 is stressed by this movement, and oscillating escapement member 43 and associated escapement wheel 44 are actuated. When ratchet member 9 disengages with ratchet wheel 10, spring 40 returns cam 18 and gear 39 to their initial position with a predetermined time delay governed by the time delay mechanism specifically comprising escapement mechanism 43—44.

In view of the detailed description included above, the operation of the automatic reclosing circuit break of our invention will be obvious to those skilled in the art. When a fault occurs on the associated system, high speed opening of contacts 4 and 5 occurs with a consequent deenergization of winding 6 and resultant immediate reclosure of these contacts. Such opening and closing of contacts 4 and 5, however, causes ratchet member 9 to rotate cam 18 a predetermined amount, insufficient, however, to close short circuiting contacts 22 and 23. If the fault was a temporary fault, such opening and closing of contacts 4 and 5 would probably clear the temporary fault and contacts 4 and 5 would remain closed. Spring 40 would rotate cam 18 to its initial position with a predetermined time delay governed by escapment mechanism 43—44.

If the fault is a permanent fault, however, contacts 4 and 5 are opened successively a predetermined number of times until such successive engagements of ratchet member 9 with ratchet wheel 10 have caused cam 18 to rotate sufficiently so that cam follower 20 moves upwardly to close short circuiting contacts 22 and 23. When this has occurred, the automatic reclosing circuit interrupter 1 is effectively maintained in the closed position so that the associated protective devices, such as fuses and the like, can operate to isolate the permanent fault. The automatic reclosing circuit interrupter 1 can be restored to service so it can repeat its protective function by manually operating lever 17. By being maintained in the closed position, however, continuity of service is maintained and the fault is isolated by suitable associated protective devices into a very small section.

It is sometimes desirable to provide an arrangement in which after a predetermined time, such as after the permanent fault has been cleared, the circuit interrupter automatically restores itself so that further protective operations can be preferred without any manual assistance being required. Accordingly, in Fig. 2, we have illustrated a modification of our invention in which clearing of the permanent fault causes the short circuiting contacts to open so that the reclosing circuit interrupter is restored to its initial condition. The corresponding parts of Fig. 2 are designated by the same reference numerals as in Fig. 1.

Instead of employing a permanent magnet such as 24 in Fig. 1, an electromagnet 45 is provided, which electromagnet 45 has a winding 46 connected in series with short circuiting contacts 22 and 23. Electromagnet 45 is therefore deenergized when contacts 22 and 23 are open but is energized as soon as they are closed and consequently effectively holds cam follower 20 in the upward position as long as it is energized with fault current. Preferably electromagnet 45 is so designed that it is incapable of holding cam follower 20 in its upward position when normal circuit currents flow but is only capable of holding it in this upward position on short circuit currents. Consequently, as soon as the permanent fault has been cleared by the operation of an associated protective device, such as a fuse, electromagnet 45 can no longer hold cam follower 20 in the upward position and short circuiting contacts 22 and 23 are opened. In the meantime, spring 40 has caused cam 18 to rotate to its initial position so cam follower 20 may move downwardly and short circuiting contacts 22 and 23 can open.

We have found that our invention is particularly adaptable for converting automatic reclosing circuit interrupters of the type used heretofore, which were incapable of being effectively "locked" in the closed position when a permanent fault occurred, to this more desirable type of circuit interrupter disclosed and claimed in the Lincks and Jensen application. This conversion can be accomplished with a minimum of change, it being merely necessary to provide the short circuiting contacts 22 and 23, the magnets and cam follower associated therewith.

It should be understood that our invention is not limited to the specific details of construction and arrangement thereof herein illustrated and that changes and modifications may occur to one skilled in the art without departing from the spirit of our invention.

What we claim as new and desire to secure by Letters Patent of the United States is:

1. An electric circuit interrupting device of the reclosing type comprising two contacts normally in engagement, an electromagnet having a winding normally connected so as to be energized by the current through said contacts when they are in engagement and having an armature which directly moves one of said contacts instantly out of engagement with the other of said contacts when the current through said winding exceeds a predetermined value, means for moving said one of said contacts into engagement with said other contact when said winding is deenergized, means actuated in response to the reclosing movement of said one of said contacts following a predetermined opening movement thereof for completing a short circuit around said electromagnet to render it inoperative to move said one of said contacts out of engagement with said other contact after said contacts are moved into engagement by said reclosing movement, magnetic means for effectively maintaining said short circuit around said electromagnet, manually operable means for moving said one of said contacts relative to the other, and means responsive to the operation of said manually operable means for rendering said magnetic means ineffective to maintain said short circuit around said electromagnet.

2. An electric circuit interrupting device of the reclosing type comprising two contacts normally in engagement, an electromagnet comprising a winding connected in series with said contacts and arranged to move one of said contacts out of engagement with the other when the current through said series connected winding and contacts exceeds a predetermined value, means for moving said contacts into engagement when said winding is deenergized, means for completing a short circuit around said electromagnet following a predetermined reclosure of said contacts to render said electromagnet inoperative to move said one contact out of engagement with said other contact, and magnetic means independent of said electromagnet and responsive to a current through said contacts in excess of a predetermined value for maintaining said short circuit around said electromagnet.

3. An electric circuit interrupting device of the reclosing type comprising two contacts normally in engagement, an electromagnet comprising a winding connected in series with said contacts and arranged to move one of said contacts out of engagement with the other when the current through said series connected winding and contacts exceeds a predetermined value, means for moving said contacts into engagement when said winding is deenergized, means responsive to a predetermined number of reclosures of said contacts for completing a shunt circuit around the winding of said electromagnet, said shunt circuit having substantially less impedance than said electromagnet so that the current through said electromagnet is insufficient to operate said contact after the completion of said shunt circuit, and a second electromagnet responsive to the current in said shunt circuit for maintaining said shunt circuit completed so long as the current therein is above a predetermined value.

4. An electric circuit interrupting device of the reclosing type comprising two contacts normally in engagement, an electromagnet comprising a winding connected in series with said contacts and arranged with the other when the current through said series connected winding and contacts exceeds a predetermined value, means for moving said contacts into engagement when said winding is deenergized, a cam rotatable in response to closing movement of said one contact, a cam follower movable in response to rotation of said cam, a pair of shunt connected contacts operable to short circuit said winding in response to a predetermined rotation of said cam, magnetic means normally disposed in spaced relation from said cam follower, an armature on said cam follower for cooperating with said magnetic means to maintain said shunt connected contacts closed after such contacts are closed by said cam follower.

5. An electric circuit interrupting device of the reclosing type comprising two main contacts normally in engagement, an electromagnet comprising a winding connected in series with said contacts and arranged to move one of said contacts out of engagement with the other when the current through said series connected winding and contacts exceeds a predetermined value, means for moving said contacts into engagement when said winding is deenergized, means whereby said main contacts are effectively maintained in the closed position comprising a circuit in parallel with said winding including a pair of normally open short circuiting contacts, means including a cam and cam follower for closing said short circuiting contacts in response to a predetermined member of reclosures of said main contacts, a movable supporting member, a stop member for holding said supporting member in spaced relation from said cam follower when said short circuiting contacts are open, and magnetic means mounted on said supporting member for magnetically holding said cam follower in the position occupied by said cam follower when said short circuiting contacts are closed.

6. An electric circuit interrupting device of the reclosing type comprising two main contacts normally in engagement, an electromagnet comprising a winding connected in series with said contacts and arranged to move one of said contacts out of engagement with the other when the current through said series connected winding and contacts exceeds a predetermined value, means for moving said contacts into engagement when said winding is deenergized, means including a circuit in parallel with said winding including a pair of normally open short circuiting contacts, means for bridging said short circuiting contacts to short circuit said winding following a predetermined number of reclosures of said main contacts whereby said main contacts are effectively maintained in the closed position, means including a magnet for holding said short circuiting contacts in the closed position once they are closed, a second magnet for opposing the action of said first magnet, manually operable means for moving said one of said main contacts out of engagement with the other, and means responsive to the operation of said manually operable means for rendering ineffective said holding means for said short circuiting contacts.

7. An electric circuit interrupting device of the reclosing type comprising two contacts normally in engagement, an electromagnet comprising a winding connected in series with said contacts and arranged to move one of said contacts out of engagement with the other of said contacts in response to the current through said series connected winding and contacts exceeding a predetermined value, means for moving said one of said contacts into engagement with said other contact when said winding is deenergized, timing means controlled by the movement of said armature for retarding the movement of said one of said contacts, means including a permanent magnet controlled by said timing means in response to a predetermined number of actuations thereof for rendering said electromagnet inoperative to move said one of said contacts out of engagement with said other contact in response to the current through said contacts exceeding said predetermined value, manually operable means for moving said one of said contacts out of engagement with the other, and means responsive to the operation of said manually operable means for rendering said permanent magnet ineffective to render said electromagnet inoperative.

8. An electric circuit interrupting device of the reclosing type comprising two contacts normally in engagement, an electromagnet comprising an armature and a winding connected in series with said contacts and arranged to move one of said contacts out of engagement with the other of said contacts in response to the current through said series connected winding and contacts exceeding a predetermined value, means for moving said one of said contacts into engagement with said other contact when said winding is deenergized, timing means controlled by the movement of said armature for retarding the movement of said one of said contacts, means responsive to a predetermined number of actuations of said timing means within a predetermined time for completing a short circuit around said winding, and a second electromagnet responsive to the current in said short circuit for maintaining said short circuit completed as long as the current therein is above a predetermined value thereby to render said electromagnet inoperable to move said one contact out of engagement with said other contact.

9. An electric circuit interrupter device of the reclosing type comprising two main contacts normally in engagement, an electromagnet comprising a winding connected in series with said contacts and arranged to move one of said contacts out of engagement with the other when the current through said series connected winding and contacts exceeds a predetermined value, means for moving said contacts into engagement when said winding is deenergized, manually operable means for moving one of said main contacts out of engagement with the other, a pair of normally open short-circuiting contacts in parallel circuit relation to said winding, means including a cam and cam follower for closing said short-circuiting contacts in response to a predetermined number of reclosures of said main contacts, a movable supporting member, magnetic means mounted on said supporting member for magnetically holding said cam follower in the position occupied by said cam follower when said short-circuiting contacts are closed, and spring means interposed between said manually operable means and said supporting member for moving said magnetic means out of its holding position with respect to said cam follower in response to opening of said contacts by said manually operable means.

BENJAMIN R. HERMANN.
SIDNEY R. SMITH, Jr.

REFERENCES CITED

The following references are of record in the file of this patent:

UNITED STATES PATENTS

| Number | Name | Date |
|---|---|---|
| 692,217 | Sundh | Jan. 28, 1902 |
| 2,069,082 | Walle | Jan. 26, 1937 |
| 2,414,786 | Lincks et al. | Jan. 21, 1947 |

Certificate of Correction

Patent No. 2,524,525 — October 3, 1950

BENJAMIN R. HERMANN ET AL.

It is hereby certified that error appears in the printed specification of the above numbered patent requiring correction as follows:

Column 3, line 3, for the word "immediately" read *immediate*; column 5, line 1, before "occupies" insert *5*; column 6, line 53, for "break" read *breaker*; column 7, line 18, for "preferred" read *performed*; column 8, line 68, after "arranged" insert *to move one of said contacts out of engagement*;

and that the said Letters Patent should be read as corrected above, so that the same may conform to the record of the case in the Patent Office.

Signed and sealed this 13th day of February, A. D. 1951.

[SEAL]

THOMAS F. MURPHY,
*Assistant Commissioner of Patents.*